UNITED STATES PATENT OFFICE.

SETH ROBINSON FOSTER, OF ST. JOHN, NEW BRUNSWICK, CANADA.

PROCESS OF FACILITATING THE CUTTING OF NAILS, TACKS, &c.

SPECIFICATION forming part of Letters Patent No. 267,864, dated November 21, 1882.

Application filed August 12, 1882. (No specimens.) Patented in Canada April 8, 1882.

*To all whom it may concern:*

Be it known that I, SETH ROBINSON FOSTER, of St. John, Province of New Brunswick, Canada, have invented a new and Improved Process of Facilitating the Cutting of Nails, Tacks, &c.; and I do hereby declare that the following is a full, clear, and exact description of the same.

My invention relates to a new and useful process for preventing the scale on iron or steel plates used in the manufacture of nails, tacks, brads, and shoe-nails from wearing into the knives, dies, and other tools of the machine while cutting without removing the natural scale on the surface of the iron or steel, thereby avoiding the waste of metal, facilitating the cutting action, and avoiding the necessity for sharpening the knives so often.

The process consists simply in coating the plates with a surface-dressing of some pulverized or finely-divided solid body mixed up with water into a paint or dressing, which is then applied and allowed to remain on the surface of said plates. I make a mixture of water and either lime, plaster, whiting, chalk, clays, or mineral paints, one of them or all of them together, and then apply this dressing to the surface of the iron and let it dry on. The iron is then prepared for use, and it will be found, on using the iron and steel thus prepared, that the machines will run one-half longer, after being ground and prepared for cutting, than they will by using iron and steel unprepared by my new process.

I am aware of a process now in use for preparing iron by scaling it. This is done by dipping the iron into sulphuric or muriatic acid and letting the acid eat off the scale. This is done only for tacks, brads, and shoe-nails, and not for common cut nails, as far as I know. My invention prepares the iron and steel for tacks, brads, and shoe-nails by an entirely different process, inexpensive compared with that just described, and quite as effectual, without the waste of iron which attends it, and, besides, my process can be used for all kinds of common cut nails, for which the other cannot be in consequence of its great expense.

I am also aware of the fact that lime-water, or a solution of lime in water, has been used, after pickling off the scale by acids, for the purpose of neutralizing the rusting effect of the acids, and I do not claim this. In my invention the finely-divided solid dressing acts in a peculiar way to produce the result described, somewhat after the manner of a cushion to the knife in entering the metal, and has a wonderful effect in avoiding the dulling of the knives.

Having thus described my invention, what I claim as new is—

The process of preparing iron and steel for facilitating the cutting of the same into nails, tacks, brads, and shoe-nails, which consists in applying to the surface of the plate a mixture of a finely-divided solid with a liquid vehicle and letting it dry on the plates for the purpose of preventing the scale on the iron or steel from wearing into the knives, dies, and other tools of the machines while cutting, substantially as described.

SETH ROBINSON FOSTER.

Witnesses:
E. C. FOSTER,
GRANVILLE F. FOSTER.